United States Patent
Ishii et al.

(10) Patent No.: US 8,469,609 B2
(45) Date of Patent: Jun. 25, 2013

(54) OPTICAL TRANSCEIVER HAVING EFFECTIVE HEAT DISSIPATING PATH FROM OSA TO COVER

(75) Inventors: Kuniyuki Ishii, Yokohama (JP); Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 13/211,709

(22) Filed: Aug. 17, 2011

(65) Prior Publication Data

US 2012/0045181 A1 Feb. 23, 2012

(30) Foreign Application Priority Data

Aug. 23, 2010 (JP) .................................. 2010-186148

(51) Int. Cl.
*G02B 6/36* (2006.01)
(52) U.S. Cl.
USPC ................... 385/92; 385/53; 385/94; 385/88; 398/135; 398/138; 398/139
(58) Field of Classification Search
USPC .................. 385/53, 92, 94, 98; 398/135, 138, 398/139
See application file for complete search history.

(56) References Cited

U.S. PATENT DOCUMENTS

| 7,280,724 | B2 * | 10/2007 | Yoshikawa ....................... 385/52 |
| 7,350,979 | B2 * | 4/2008 | Mizue et al. .................... 385/53 |
| 2004/0105633 | A1 | 6/2004 | Ishikawa et al. |
| 2005/0084269 | A1 * | 4/2005 | Dallesasse et al. ........... 398/135 |
| 2005/0286839 | A1 * | 12/2005 | Yoshikawa ...................... 385/92 |
| 2008/0187316 | A1 * | 8/2008 | Dallesasse et al. ............. 398/91 |

* cited by examiner

*Primary Examiner* — Brian Healy
*Assistant Examiner* — Guy Anderson
(74) *Attorney, Agent, or Firm* — Venable LLP; Michael A. Sartori; Tamatane J. Aga (57) ABSTRACT

A heat transferring mechanism of an optical transceiver is disclosed. The optical transceiver includes a metal cover, a OSA that generate heat, and a heat conductor. The OSA has the heat transferring surface extending to a direction intersecting, or substantially in perpendicular, to the longitudinal direction of the optical transceiver. The heat conductor, which is formed only by cutting and bending of metal plate, includes a contact plate and the transfer plate in thermally contact to a heat transferring surface of the OSA and an inner surface of the metal cover to form an effective heat transferring path from the OSA to the cover.

10 Claims, 10 Drawing Sheets

OPTICAL TRANSCEIVER HAVING EFFECTIVE HEAT DISSIPATING PATH FROM OSA TO COVER

BACKGROUND OF THE INVENTION

Field of the Invention

The present invention relates to an optical transceiver that installs an optical subassembly (hereafter denoted as OSA) having a heat dissipating surface extending in a direction intersecting, or substantially in perpendicular, to the longitudinal direction of the optical transceiver.

An optical transceiver that installs a transmitter OSA (hereafter denoted as TOSA) to transmit signal light and a receiver OSA (hereafter denoted as ROSA) to receive another signal light to realize the full-duplex optical communication. Some TOSAs or ROSAs install a device to generate heat within a package thereof. In particular, a thermo-electric cooler (hereafter denoted as TEC), which may control a temperature of a light-generating device such as semiconductor laser diode (hereafter denoted as LD), generates large heat; accordingly, the OSA installing such TEC is necessary to dissipate heat effectively to, for instance, a housing of the transceiver. The United States Patent, published as US20040105633A, has disclosed a mechanism to conduct heat generated in the TOSA to the housing through a thermal sheet, where the TOSA has, what is called as, a co-axial package.

Figure 9:
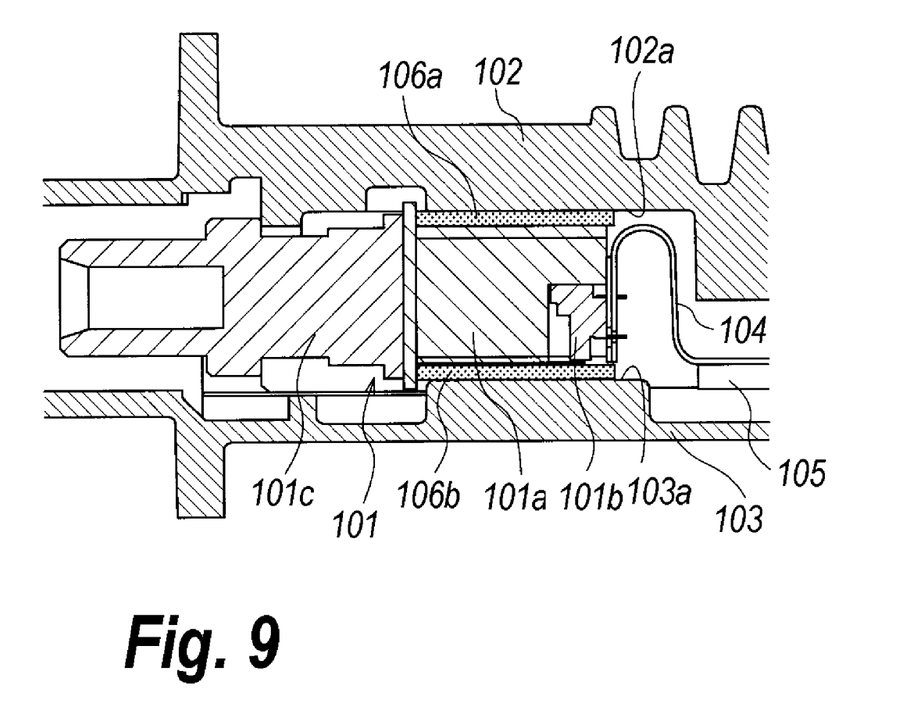
FIG. 9 is a cross section of the conventional heat dissipating mechanism, where the cross section is taken along the longitudinal direction of the conventional optical transceiver.

FIG. 9 is a cross section taken along the longitudinal direction of the optical transceiver, where the optical transceiver installs the OSA 101, and the circuit board 105 connected with a flexible printed circuit (hereafter denoted as FPC) board 104. The OSA 101 includes a package 101*a* with a stem 101*b* and a sleeve portion 101*c*. The stem 101*b* has lead pins electrically connected to the circuit board 105 through the FPC board 104. The heat generated in the package 101*a* may dissipate to the covers, 102 and 103, through respective thermal sheets, 106*a* and 106*b*. In this conventional arrangement, the heat dissipating surfaces of the package are in parallel to the longitudinal direction of the covers, 102 and 103, that is, the heat dissipating surface of the package 101*a* extends in parallel to the inner surface of the cover. When the heat dissipating surface of the package extends not in parallel to the inner surface of the cover, some devised mechanism is necessary to secure a good head-dissipating path from the package to the cover.

SUMMARY OF THE INVENTION

An aspect of the present invention relates to a mechanism or a structure of an optical transceiver to transfer heat generated in an OSA to a cover of the optical transceiver. The cover, which may be made of metal, has a longitudinal direction and an inner surface extending along the longitudinal direction. The OSA includes a package that has a heat radiating surface extending to a direction intersecting to the longitudinal direction of the metal cover. A feature of the optical transceiver of the present invention is that the optical transceiver may further include a heat conductor made of metal. The heat conductor includes a contact plate and a transfer plate. The contact plate may be in thermally contact with the heat radiating surface of the package of the OSA; while, the transfer plate is in thermally contact with the inner surface of the cover. Thus, the heat conductor may form an effective heat conducting path from the OSA to the cover of the housing even when the heat radiating surface of the OSA is substantially in perpendicular to the longitudinal direction of the housing.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS

Figure 1:
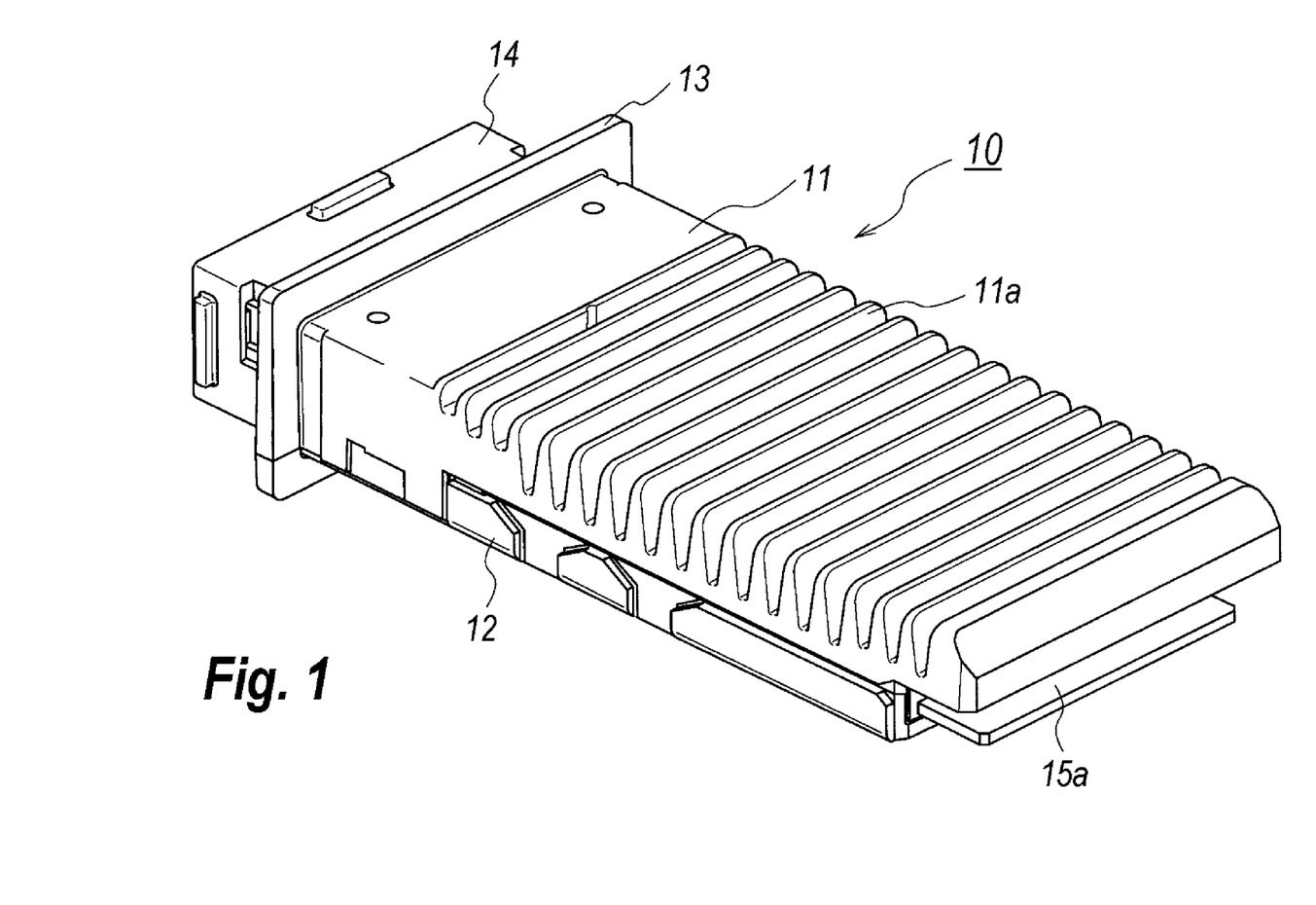
FIG. 1 is a perspective view showing an outer appearance of the optical transceiver according to the present invention.

Details of the present invention will be described as referring to the drawings. An optical module according to an embodiment of the invention will be installed in an optical transceiver 10 as shown in FIG. 1. The optical transceiver 10 in FIG. 1 includes a TOSA, a ROSA, and electronic circuits communicating with the TOSA and the ROSA mounted on a circuit board, wherein they are installed between an upper cover 11 and a lower cover 12.

The upper and lower covers, 11 and 12, which is a housing of the optical transceiver 10, may be made of metal to radiate heat generated in the housing effectively. The upper cover 11 includes a plurality of fins 11*a* to enhance the heat radiation. The housing includes a flange 13 in a front side thereof so as to cover a port provided in the host system into which the optical transceiver 10 is inserted. The housing further includes, in a front of the flange 13, an optical receptacle 14 that receives an external optical connector; while, the housing includes, in a rear end thereof, an electrical plug 15*a* to communicate with the host system. The plug 15*a* is formed in an end of the circuit board.

Figure 2:
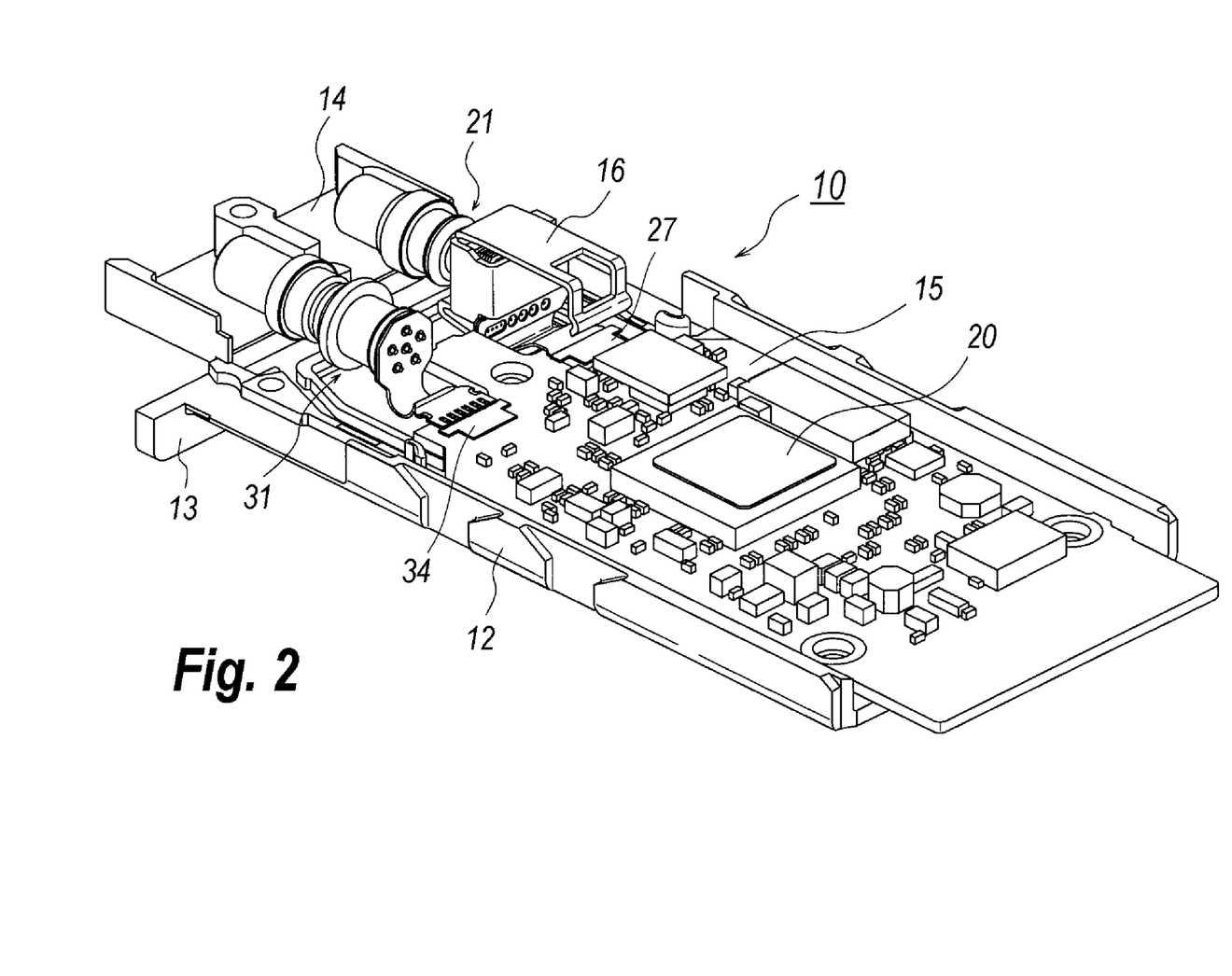
FIG. 2 shows an inside of the optical transceiver shown in FIG. 1 by removing the upper cover thereof.

FIG. 2 shows an inside of the optical transceiver 10, which removes the upper cover 11. The circuit board 15, which is mounted on the lower cover 12, installs passive components and some ICs 20 thereon. The TOSA 21 and the ROSA 31 are placed in a front side of the lower cover 12, where they are electrically coupled with the circuit board 15 through respective FPC boards, 27 and 34.

The light-transmitting device such as an LD installed in the TOSA 21 and the IC 20 mounted on the circuit board 15 are the two components among other components mounted within the optical transceiver 10 that generate large heat. The present invention relates to a mechanism to transfer heat generated in the TOSA 21 effectively to the outside of the transceiver 10. The TOSA 21 of the present embodiment has the ceramic package that thermally couples with a heat conductor 16; and this heat conductor also thermally couples with the upper cover 11. Thus, a heat transferring path from the TOSA 21 to the upper cover 11 may be secured.

Figure 3:
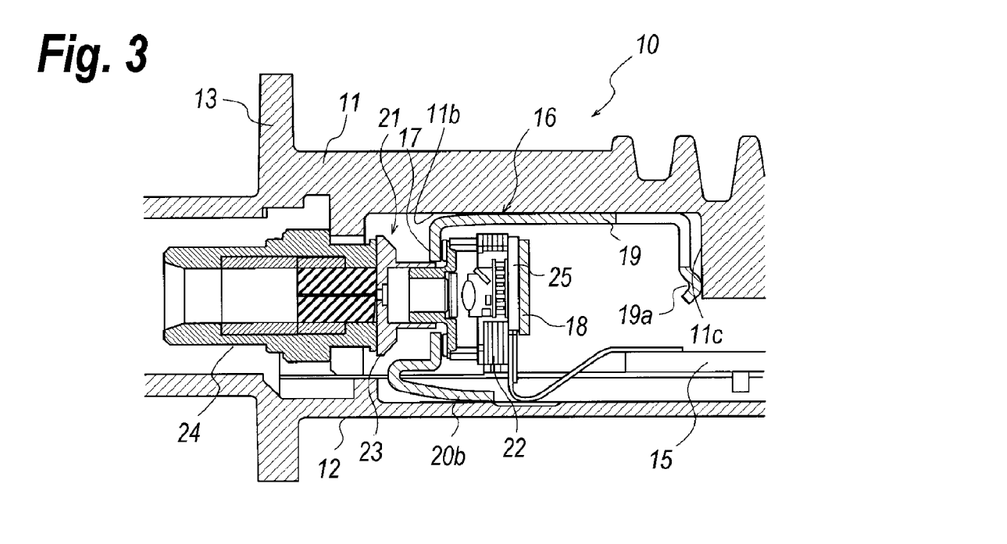
FIG. 3 is a cross section showing the heat dissipating mechanism according to an embodiment of the present invention.

FIG. 3 shows a cross section of the front portion of the optical transceiver 10, which explains the heat transferring path above described. The TOSA 21, where details thereof, in particular, the outer shape thereof will be described as referring to FIGS. 4 to 6, includes a ceramic package 22, a sleeve member 24 and a joint sleeve 23 that couples the ceramic package 22 with the sleeve member 24. The TOSA 21 radiates heat generated therein through a surface of its bottom member 25. Accordingly, the path to transfer heat is necessary to be established from the bottom member 25 of the package 22 to the inner surface 11b of the upper cover 11. A feature of this path to transfer heat is that two surfaces, namely the bottom member 25 of the package and the inner surface 11b of the upper cover 11, forms substantially a right angle, or in other words, the bottom surface 25 extends in a direction intersecting or in perpendicular, to the longitudinal direction of the housing.

The optical transceiver 10 of the present embodiment provides the heat conductor 16 made of metal with substantial elasticity and good thermal conductivity. The heat conductor 16, details of which will be described later, includes a support plate 17 to be held by the ceramic package 22, a contact plate 18 to be in contact with the bottom member 25 of the ceramic package 22, a transfer plate 19 to be in thermally contact with the inner surface 11b of the upper cover 11. The heat conductor 16 may further include another transfer plate 19b, which will be called as the sub-transfer plate, to be in thermally contact with the inner surface of the lower cover 12. Thus, the heat generated in the TOSA 21 may be effectively transferred to the covers 11, and 12.

The heat conductor 16 may be made of aluminum, copper or the like with substantial elasticity and good thermal conductivity. The heat transferring path of the present embodiment may further include a thermal gel or the like between the bottom member 25 of the ceramic package 22 and the contact plate 18 of the heat conductor 16. The thermal gel or the like may be put between the transfer plate 19 and the inner surface 11b of the upper cover 11. Thermal gel may be elastically deformed so as to fill gaps between the members. The thermal gel or the like may securely enhance the heat transfer between the members.

The TOSA 21 is aligned along the optical axis of the transceiver by putting the root portion of the sleeve member 24 thereof between the covers, 11 and 12, which automatically defines the longitudinal position of the bottom member 25 of the ceramic package 22. Although the ceramic package 22 inherently has dimensional dispersion, the heat conductor 16 in the transfer plate 19 thereof may movably come in contact with the inner surface 11b as rigidly in contact with the bottom member 25 by the contact plate 18. Thus, the path to transfer heat from the bottom member 25 of the ceramic package 22 to the upper cover 11 may be formed independent of the longitudinal position of the TOSA 21.

Figure 4:
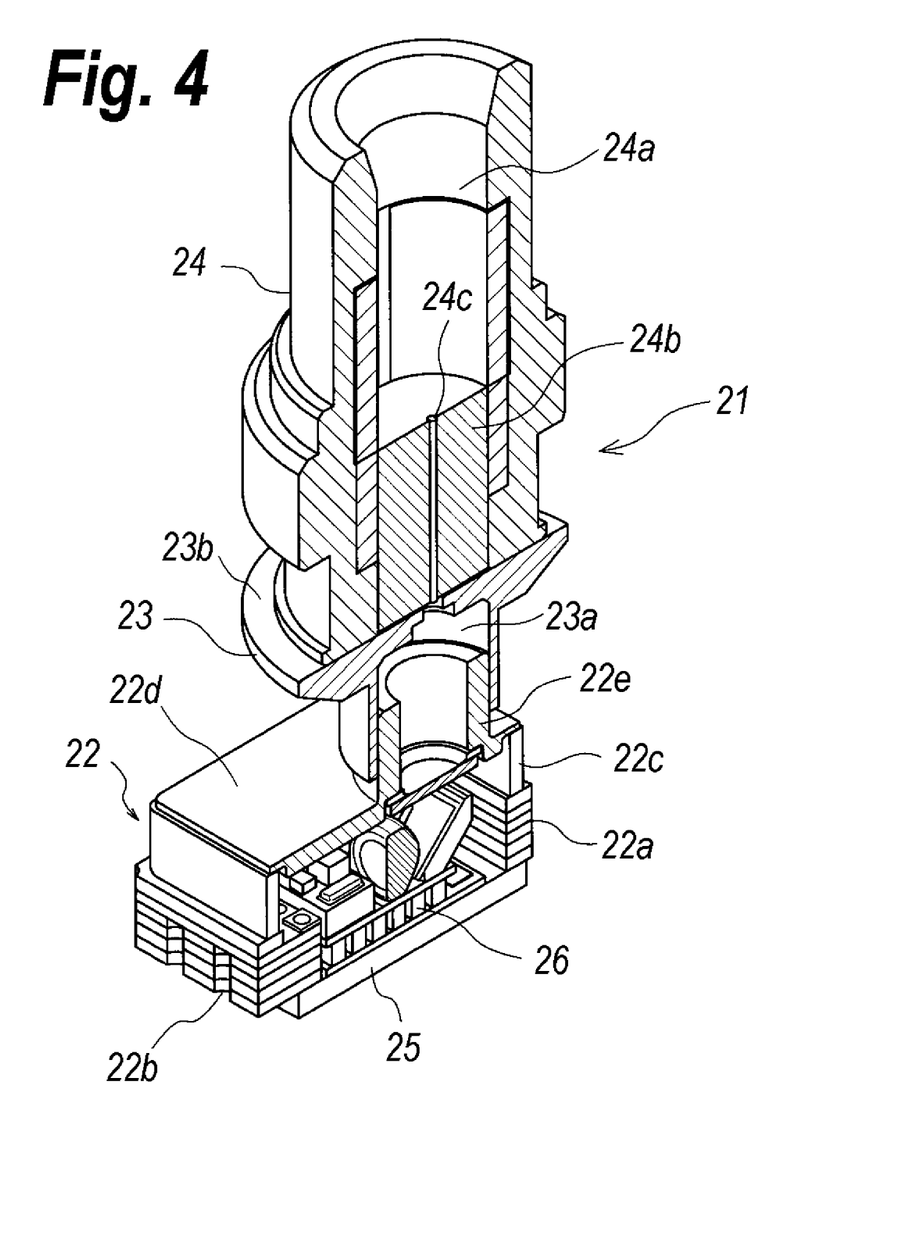
FIG. 4 is a partially cut view showing the TOSA installed within the optical transceiver shown in FIG. 1.
Figure 5:
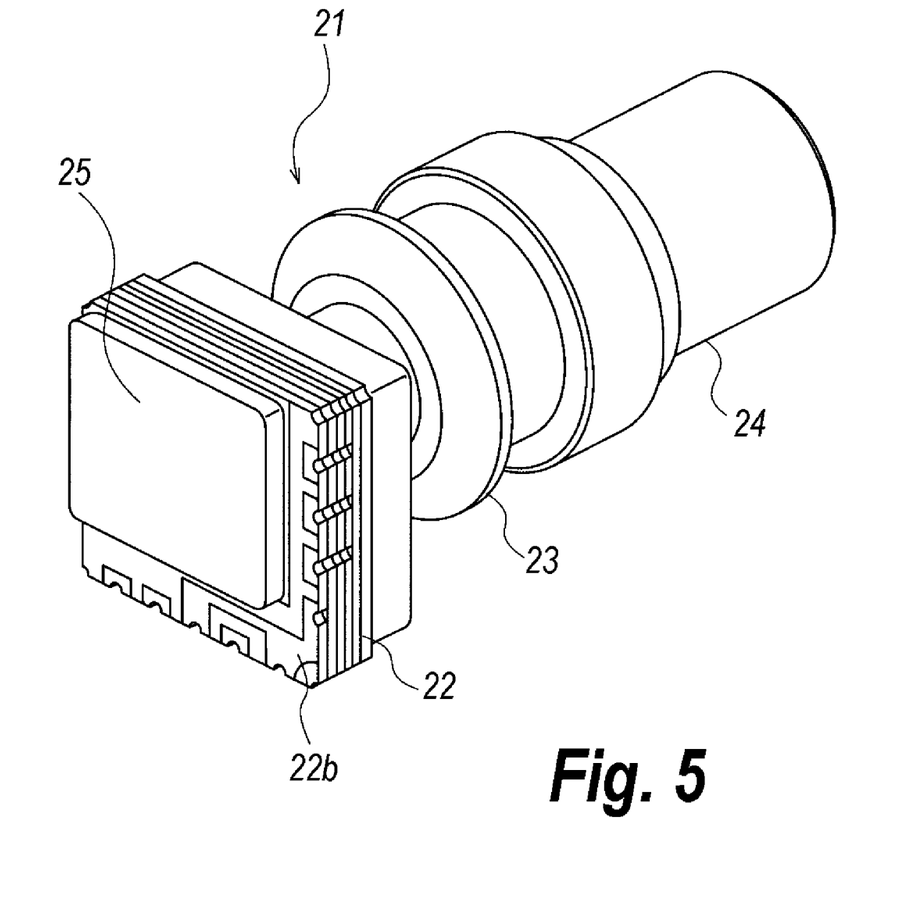
FIG. 5 is an outer appearance of the TOSA shown in FIG. 4.
Figure 6A:
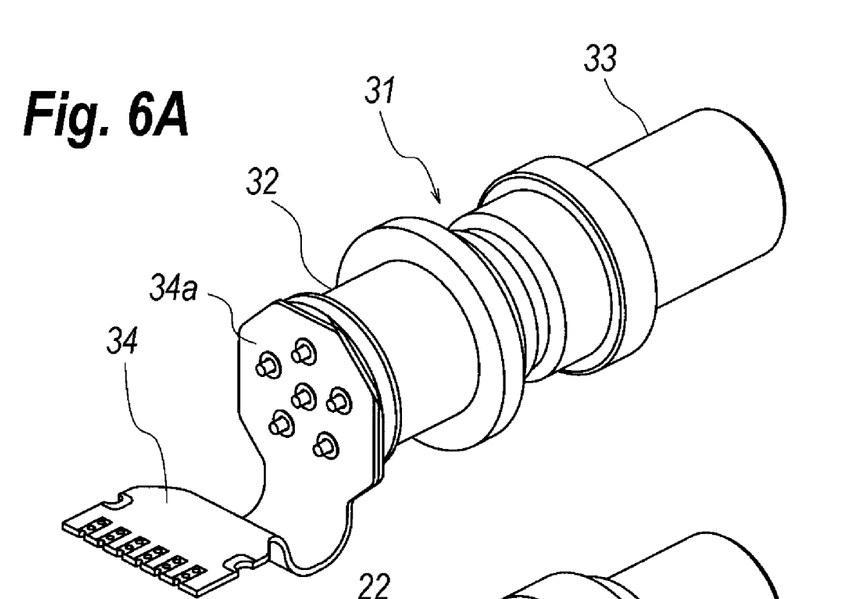
FIGS. 6A and 6B show the ROSA and the TOSA, respectively, each installed within the optical transceiver shown in FIG. 1, where the ROSA and the TOSA assemble with respective FPC boards.
Figure 6B:
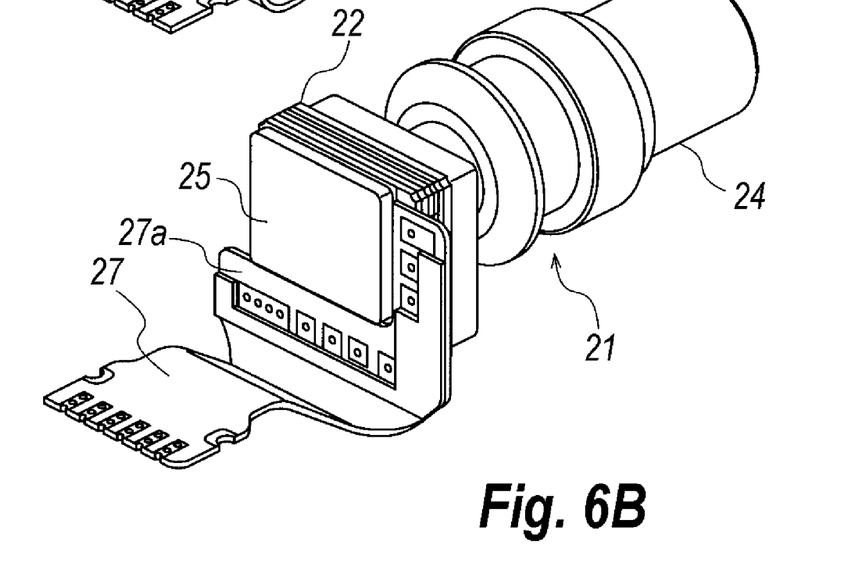

FIGS. 4 to 6 show details of the TOSA 21 of the present embodiment. The TOSA 21 may primarily comprise the multi-ceramic package 22, the joint sleeve 23 and the sleeve member 24. The joint sleeve 21 couples the sleeve member 24 with the ceramic package 22. A plurality of ceramic layers orderly stacked to each other on the bottom member 25 forms the side wall 22a of the ceramic package 22. The side wall 22a includes electrodes 22b to bring out the interconnections to the outside of the package 22. Further, the side wall 22a mounts the ceiling 22d thereon through the sub wall 22c. The ceiling 22d includes, in a position offset from a center thereof, a cylinder 22e to be coupled with the joint sleeve 23. The bottom member 25, which may be made of metal, mounts a thermo-electric controller (TEC) 26 thereof; while, the LD and other optical components are mounted on the TEC 26. When the upper plate of the TEC 26 absorbs heat, that is, the upper plate is cooled down, while the lower plate thereof is heated up. Therefore, the TEC 26, in particular, the lower plate thereof, is the device to generate large heat. The heat generated by the TEC 26 is transferred to the bottom member 25 of the ceramic package 22, and the heat conductor 16 in firmly contact with the bottom member 25 by the contact plate 18 thereof may effectively transfer this heat to the upper cover 11.

The joint sleeve 23 couples the ceramic package 22 with the sleeve member 24. That is, receiving the cylinder 22e of the ceramic package 22 by the bore 23a and adjusting the overlapping therebetween, the optical alignment between the ceramic package 22 and the sleeve portion 24 is carried out along the optical axis thereof. While, sliding the root end of the sleeve member 24 on the top surface 23b of the joint sleeve 23, the optical alignment in two directions perpendicular to the optical axis may be carried out.

The sleeve member 24 optically couples with an external fiber. Specifically, the sleeve member includes a sleeve 24a and a stub 24b that includes a coupling fiber 24c in a center thereof. Receiving an external ferrule in the sleeve 24, the external fiber held in the center of the ferrule abuts against the coupling fiber 24c. Thus, the light emitted from the LD in the ceramic package 22, which enters in an end of the coupling fiber 24c may be transmitted to the external fiber.

The bottom member 25 of the ceramic package 22 protrudes from the end of the ceramic layer. Specifically, the end of the ceramic layer includes electrodes 22b in two side spaces of the square which form an L-shape, while, the bottom member 25 occupies the rest. The electrodes 22b in the L-shaped rear end of the ceramic layer are connected to the FPC board 27 as shown in FIG. 6B. The FPC board 27 has a plane shape so as to escape the bottom member 25. FIG. 6A shows a connection of the ROSA 31 by the other FPC board 34. As shown in FIG. 6A, the ROSA has a co-axial package, or sometimes called as a CAN-package with lead pins connected to the root portion 34a of the FPC board 34. The co-axial package 32 of the ROSA 31 may attach the sleeve member 33 thereto.

Figure 7A:
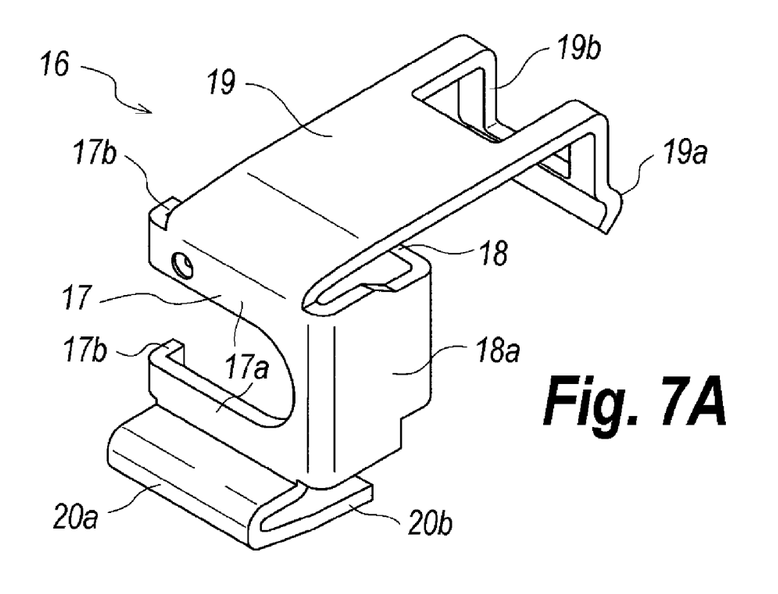
FIGS. 7A and 7B show the heat conductor according to an embodiment of the present invention.
Figure 7B:
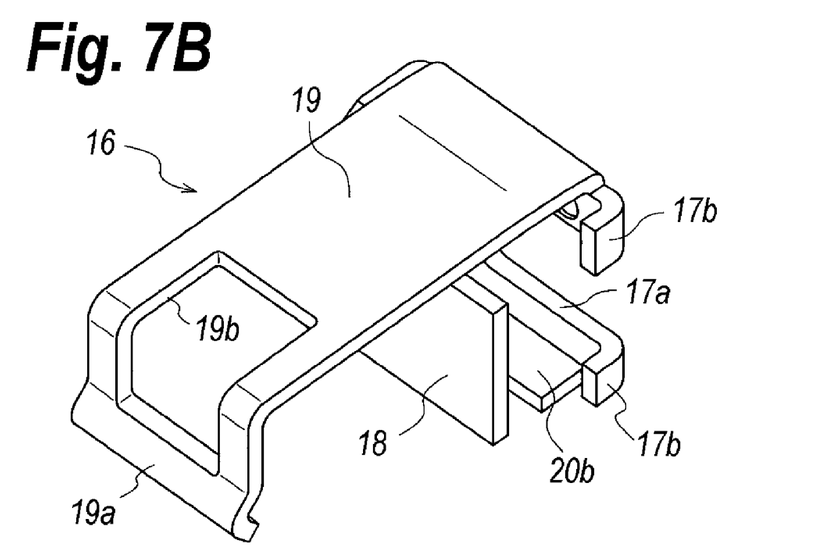
Figure 8A:
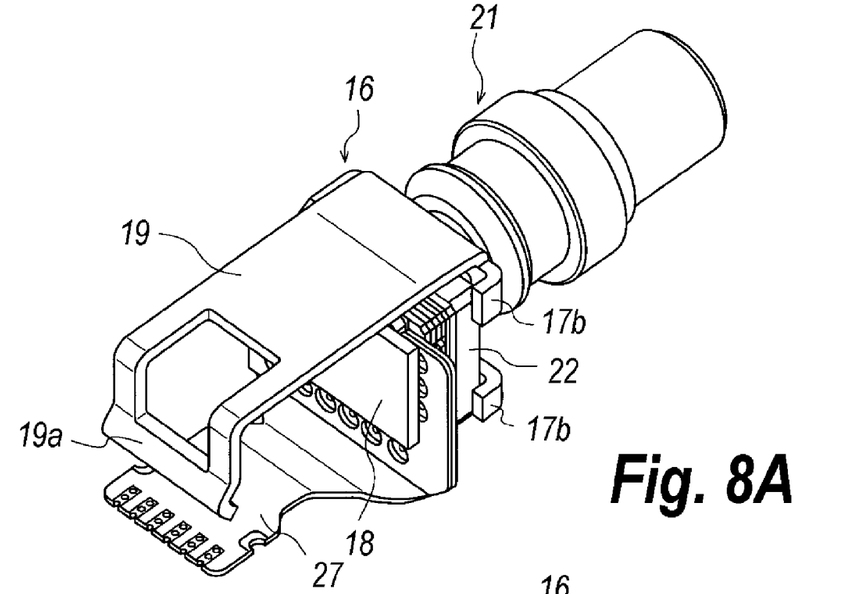
FIGS. 8A and 8B show the TOSA assembled with the FPC board and the heat conductor.
Figure 8B:
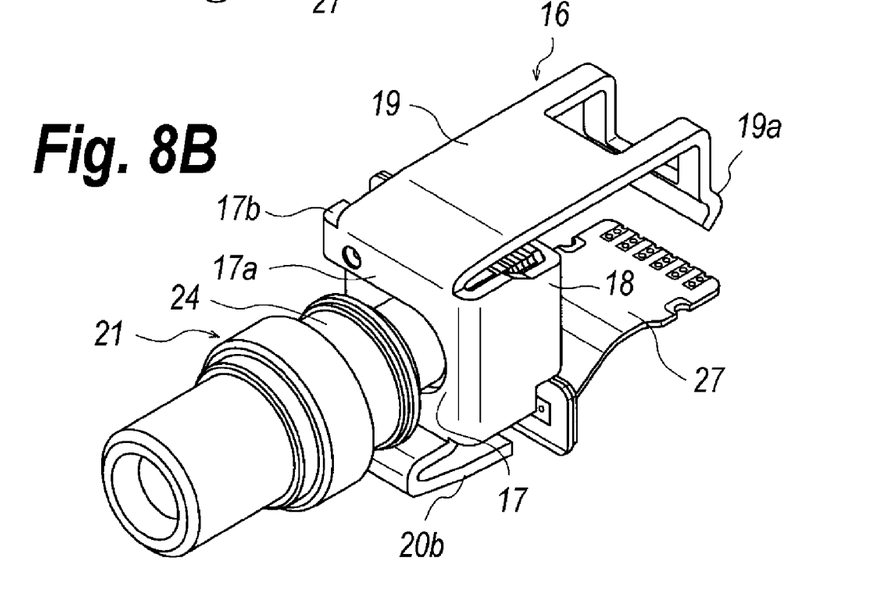

FIGS. 7A and 7B view the heat conductor 16 from the front and rear, respectively; and FIGS. 8A and 8B are perspective views of the heat conductor 16 assembled with the TOSA 21. The heat conductor 16, as already explained, may be made of metal with substantial elasticity and good thermal conductivity. Typical material for the heat conductor 16 is aluminum or copper, where the thermal conductivity of aluminum is 236 W/(m·K), while, that of copper is 398 W/(m·K), which are comparable to zinc whose thermal conductivity is 98 W/(m·K). The thermal conductivity of resin material is far less than that of aluminum and copper.

The heat conductor 16, as shown in FIGS. 7A and 7B, may be made of metal plate formed only by cutting and bending without soldering, welding, or the like, which may reduce the cost thereof. The heat conductor 16 includes the support plate 17, the contact plate 18, and the transfer plate 19. The heat conductor 16 may be supported in the support plate 17 thereof by the ceramic package 22. Specifically, the support plate 17 includes a U-shaped cut that divides the support plate 17 into two parts 17a whose end is bent to form a hook 17b.

The contact plate 18 may be formed by bending one side of the support plate 17 twice. That is, the side of the support plate 18 is bent rearward to form a side 18a, and bent again in the end of the side 18a inward to form the U-shaped cross section. The transfer plate 19 may be also formed by bending another side of the support plate 17. That is, the top end of the support plate 17 is bent rearward to form a wide transfer plate 19. The end of the transfer plate 19 has a pair of arms 19b, and these arms are bent downward and connected to form a bridge 19a in the end thereof. The cross section of the bridge 19a extrudes rearward so as to form a rib. The still another side of the support plate 17, namely, the bottom side thereof is bent forward, and turned rearward at the tip end 20a to form the sub-transfer plate 20b. Thus, the front bottom of the heat conductor 16 makes the U-shaped cross section.

FIGS. 8A and 8B show the assembly of the TOSA 21 with the heat conductor 16. As shown in FIGS. 8A and 8B, the heat conductor 16 is supported by the ceramic package 22 such that the support plate 17 and the contact plate 18 put the ceramic package 22 therebetween. Inserting the root of the sleeve member 24 into the cut between the branches 17a of the support plate 17 until the hook 17b hooks the ceramic package 22, and making the contact plate 18 in contact with the bottom member 25, the heat conductor 16 may be assembled with the TOSA 21. The branches 17a of the support plate 17, the side 18a and the contact plate 18, and the hooks 17b surround the ceramic package 22. The hook 17b may prevent the ceramic package 22 from slipping off from the heat conductor 16.

The transfer plate 19, which extends from the top side of the support plate 17, extends to a direction intersecting the contact plate 18 so as to get over the ceramic package 22, and bends slightly upward to come in elastically contact to the inner surface 11b of the upper cover 11. Similarly, the sub-transfer plate 20b, which extends rearward from the side of the lower branch 17a, is bent slightly downward to come in elastically contact with the inner surface of the lower cover 12. Moreover, as shown in FIG. 3, the tip of the bridge 19a comes in contact with the other inner surface 11c of the upper cover 11.

The function of the heat conductor 16 for the TOSA 21 will be described as referring to FIG. 3. Because the tip of the bridge 19a comes in contact with the surface 11c of the upper cover 11 and the arm 19b, an end of which forms the bridge 19a, inherently shows the elastic characteristic by being bent in substantially in right angle, which generates a repulsive force affecting the contact plate 18 through the transfer plate 19 and the support plate 17. Thus, the contact plate 18 may be pushed to the bottom member 25 of the ceramic package 22. However, the ceramic package 22, or the TOSA 21, is rigidly fixed in the sleeve portion 24 thereof with respect to the upper cover 11; the contact plate 18 may be in thermally and reliably contact with the bottom member 25.

The transfer plate 19 and the sub-transfer plate 20, where they are formed to be slightly bent outwardly, may be elastically deformed when both covers, 11 and 12, are assembled to each other, which may be in thermally and reliably contact with the covers and provide the efficient transferring path to the covers, 11 and 12. Thus, even when the bottom member 25 of the ceramic package 22 extends in the direction intersecting, or substantially in perpendicular, to the extending directions of the covers, 11 and 12, the heat conductor 16 may form the heat transferring path from the bottom member 25 to the covers, 11 and 12.

The present invention has been fully described in conjunction with the preferred embodiment thereof with reference to the accompanying drawings. However, it is to be understood that various changes and modifications may be apparent to those skilled in the art. For instance, the heat conductor 16 comes in directly contact to the bottom member 25 of the ceramic package 22 and the inner surface, 11b of 11c, of the package. The heat conductor 16 may come in indirectly contact with those members via, for instance, a thermal sheet, thermal grease, and the like. Such a member may absorb the roughness of the interface between two members and enhance the heat transfer therebetween.

Figure 10:
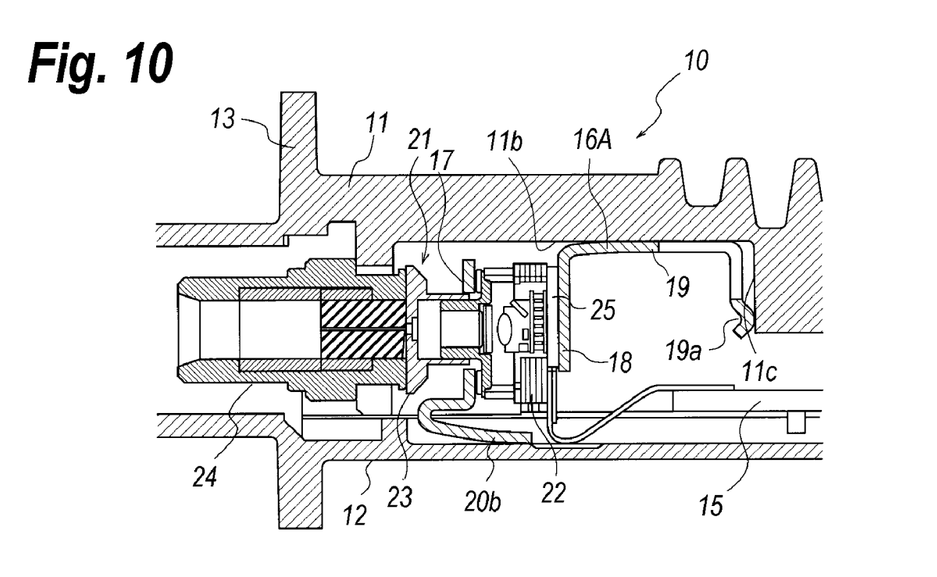
FIG. 10 is a cross section showing the heat dissipating mechanism of the optical transceiver according to another embodiment of the present invention.

Furthermore, the embodiment described above extends the transfer plate 19 from the support plate 17 so as to get over the ceramic package 22. However, the transfer plate 19 may extends from the contact plate 18, as shown in FIG. 10. Even the heat conductor 16A has such an arrangement, the functions same as those of the heat conductor 16 may be realized. Such changes and modifications are to be understood as included within the scope of the present invention as defined by the appended claims, unless they depart therefrom.

What is claimed is:

1. An optical transceiver, comprising:
   a metal cover having a longitudinal direction and an inner surface, the longitudinal direction being along a direction connecting an optical receptacle and an electrical plug, the inner surface extending along the longitudinal direction;
   an optical subassembly including a package having a heat radiating surface extending in a direction intersecting the longitudinal direction of the cover; and
   a heat conductor made of metal, the heat conductor including a contact plate, a transfer plate, and a support plate, the contact plate being in thermal contact with the heat radiating surface of the optical subassembly, the transfer plate being in thermal contact with the inner surface of the metal cover, the support plate being supported by the optical subassembly, the support plate and the contact plate of the heat conductor putting the package of the optical subassembly therebetween,
   wherein the heat conductor forms a heat transferring path from the optical subassembly to the metal cover.

2. The optical transceiver of claim 1,
   wherein the transfer plate is bent at an end of the support plate.

3. The optical transceiver of claim 1,
   wherein the transfer plate is bent at an end of the contact plate.

4. The optical transceiver of claim 1,
   wherein the contact plate is bent twice at an end of the support plate.

5. The optical transceiver of claim 1,
   wherein the metal cover includes an upper cover and a lower cover assembled with the upper cover to form a space to house the optical subassembly and the heat conductor therein,
   wherein the heat conductor further includes a sub-transfer plate bent at an end of the support plate, and
   wherein the transfer plate is in thermal contact with the upper cover, and the sub-transfer plate is in thermal contact with the lower cover.

6. The optical transceiver of claim 5,
   wherein the sub-transfer plate is slightly bent outwardly.

7. The optical transceiver of claim 1,
wherein the transfer plate is slightly bent outwardly.

8. The optical transceiver of claim 1,
wherein the transfer plate includes a pair of arms each extending from an end of the transfer plate and bent in substantially right angle,
wherein the arms are connected in respective ends thereof to form a bridge having a rib in contact with another inner surface of the upper cover.

9. The optical transceiver of claim 8,
wherein the other inner surface extends in substantially perpendicular to the inner surface of the cover.

10. The optical transceiver of claim 1,
wherein the optical subassembly is a transmitter optical subassembly that installs a semiconductor laser diode and a thermo-electric cooler that mounts the semiconductor laser diode thereon,
wherein the thermo-electric cooler is mounted on a member including the heat radiating surface.

\* \* \* \* \*